Figure 7:
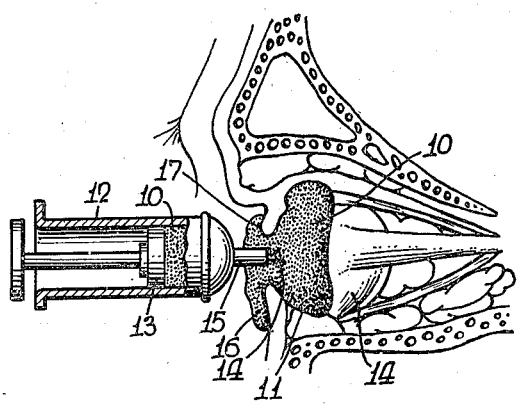

April 19, 1949. P. J. MURPHEY ET AL 2,467,401
ARTIFICIAL EYE AND METHOD OF MAKING SAME
Filed Jan. 23, 1945 3 Sheets-Sheet 1
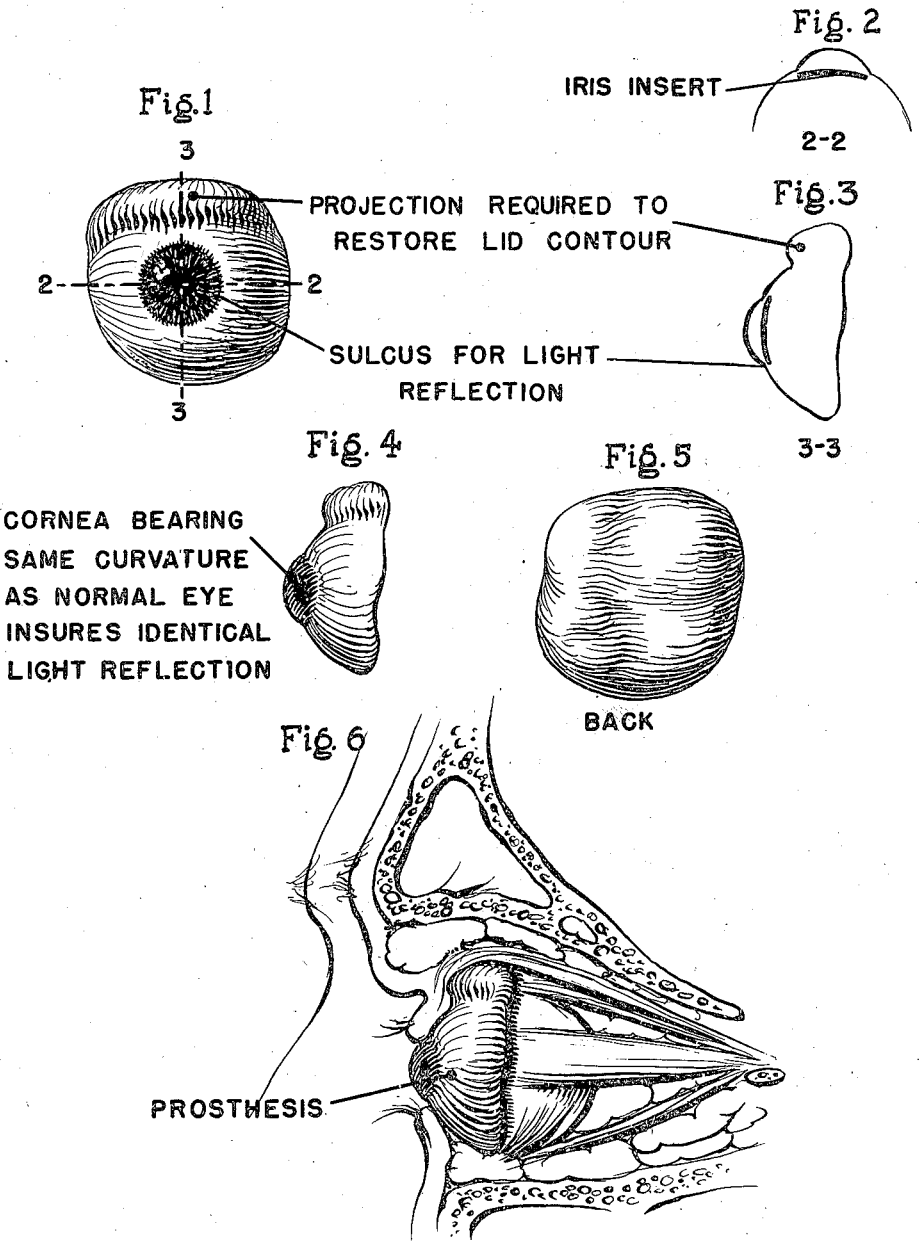
Inventors
PHELPS J. MURPHEY
LEON SCHLOSSBERG April 19, 1949. P. J. MURPHEY ET AL 2,467,401
ARTIFICIAL EYE AND METHOD OF MAKING SAME
Filed Jan. 23, 1945 3 Sheets-Sheet 2

INVENTORS.
Phelps J. Murphey
Leon Schlossberg
BY
Harry Ernest Rubens
ATTORNEY.

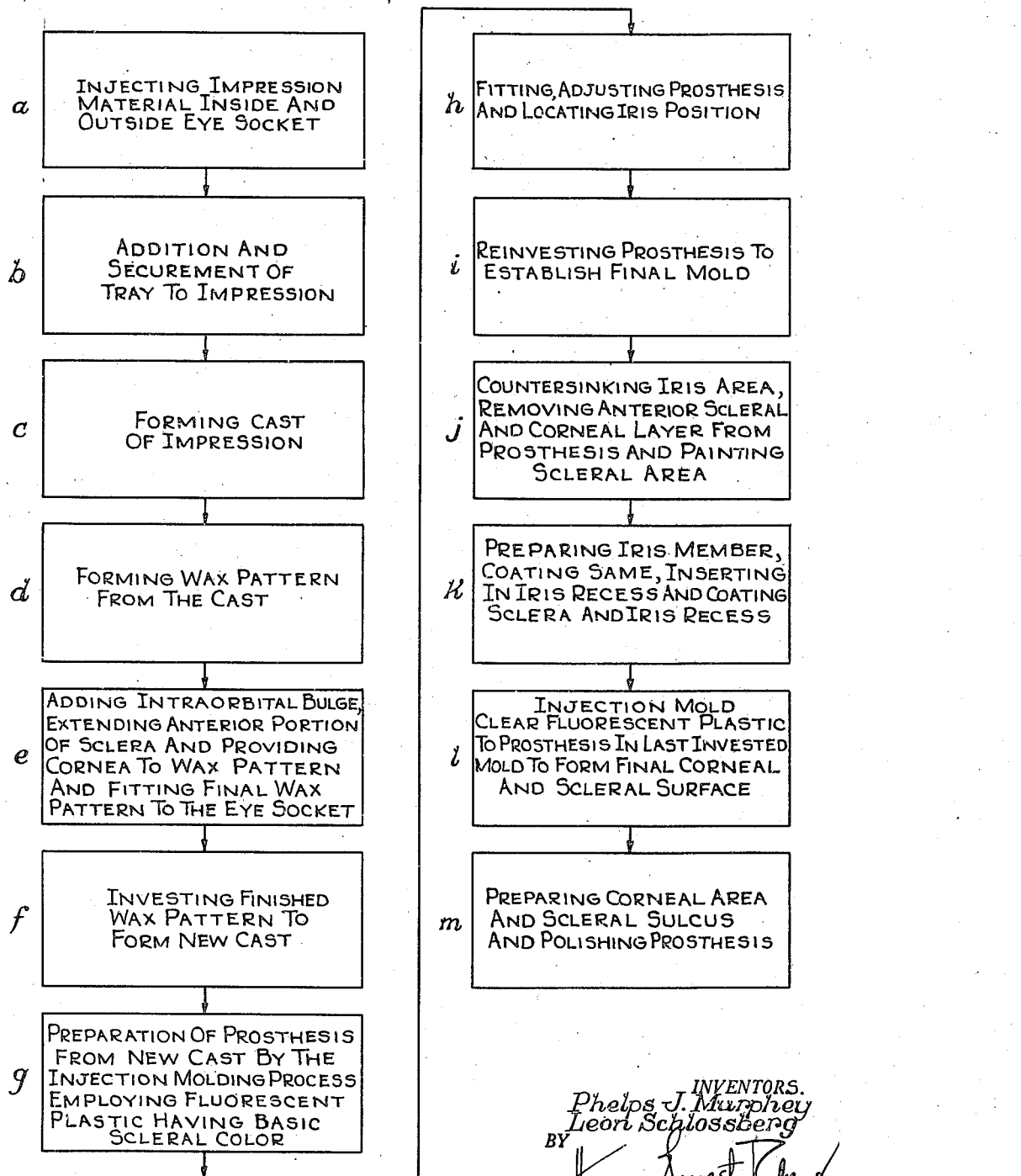

Patented Apr. 19, 1949

2,467,401

UNITED STATES PATENT OFFICE 2,467,401

ARTIFICIAL EYE AND METHOD OF MAKING SAME

Phelps J. Murphey and Leon Schlossberg,
United States Navy

Application January 23, 1945, Serial No. 574,179

5 Claims. (Cl. 3—13)

(Granted under the act of March 3, 1883, as amended April 30, 1928; 370 O. G. 757)

This invention relates to artificial eyes and a method of making same, and more particularly to a method of ocular replacement by maxillo-facial prosthesis and the article produced thereby.

Often eye replacements made from glass or acrylic resins are apt to be a source of extreme embarrassment and may complicate the patient's rehabilitation. The natural contours of the face may not be restored, especially in the orbital portion above the eye, which may appear sunken, and the replacement often is not adapted for muscle coordination.

The object of this invention is to provide adequate eye replacements, which will restore the normal contours of the face, and which will be functional in their movement and accurate in duplication of color and light reflection.

Another object of the invention is to provide a method of eye replacement in which the muscles of the eye are accommodated in such a manner as to permit normal functional movement of the eye replacement.

A further object of the invention is to provide ocular replacements which substantially fill and fit the orbital cavity and which accurately duplicate the natural eye in appearance and esthetic qualities.

Other objects will appear in the disclosure.

According to the invention, these objects are accomplished by forming a pattern of the eye, adapted to the eye socket to reproduce the maximum amount of physiologic muscle-stimulative eye movement and restoration of facial contours, duplicating the wax pattern in a plastic prosthesis, to which has been added certain colors to simulate eye colors of the sclera, inserting a painted iris into the scleral portion of the prosthesis, adding a clear cornea, and covering the scleral area with a clear sclera.

The pattern of the eye may be made by first taking an impression of the eye socket, duplicating the impression in wax, and then, if necessary, trimming, shaping, and adding wax to restore lid contours and to provide maximum accommodation of the eye muscles. Since each eye socket presents a variable structural and physiological function requirement, a close scrutiny should be made of the existing muscle movements to be accommodated. The degree of potential movement of the artificial eye will be determined by the lateral, oblique, and vertical movements of the existing muscle attachments in the walls of the socket. Reference is made to any standard text on anatomy for a description of the muscles of the orbit. The remnants of these muscles, created by whole or partial eyeball enucleation or evisceration, determine the movement possible in the completed prosthesis.

The principal muscle to be accommodated is the levator palpebrae superioris, which lies beneath the roof of the orbit and covers the superior rectus. This muscle is accommodated and the upper lid contour restored by superior extensions to the prosthesis. The superior extension may be termed an intraorbital bulge which causes the pars orbitalis to assume its previous natural contour. This bulge pushes the levator palpebrae superioris and orbicularis oculi muscle fibers in the upper lid forward and actively engages these muscles to aid in functional movement. The intraorbital bulge is not a natural configuration of the eye but is necessary in the prosthesis to compensate for loss of fatty tissue and muscle tone. When the patient looks down there is a forceful retention action of this muscle, together with a forward expulsion action of the muscle remnants in the fascia of the back wall. These latter muscles must be accommodated by a concavity on the back portion of the prosthesis. Without the superior extension on the prosthesis and concavity on the back portion of the prosthesis, the replacement may flip out when the patient looks downward. In like manner the orbicularis oculi muscle fibres in the lower lid must be utilized, when the patient looks upward, by an inferior extension on the prosthesis on its lower margin. Posterior, lateral, and medial extensions may be added to aid in functional movement of the eye.

Figure 10:
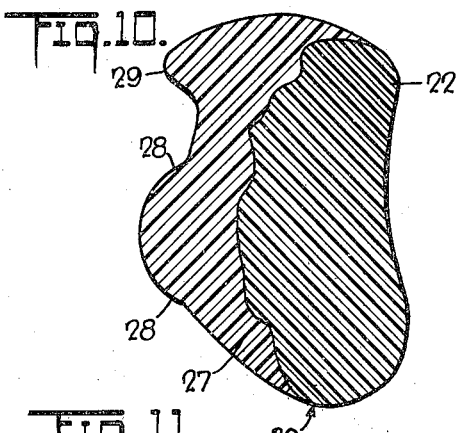
Figure 8:
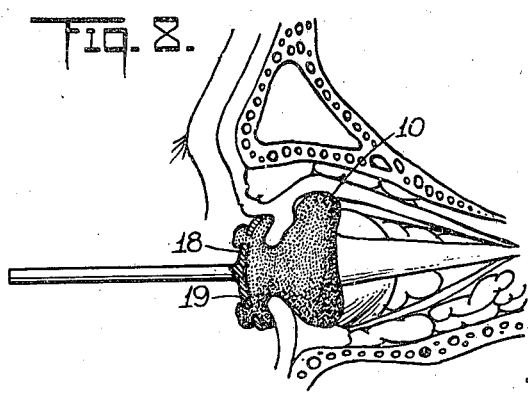
Figure 11:
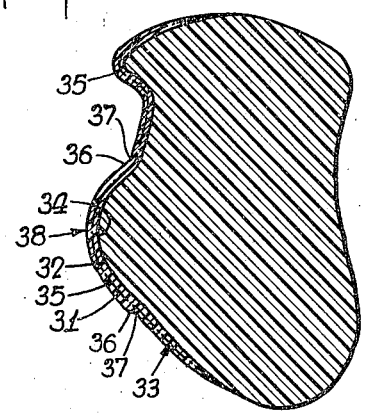
Figure 9:
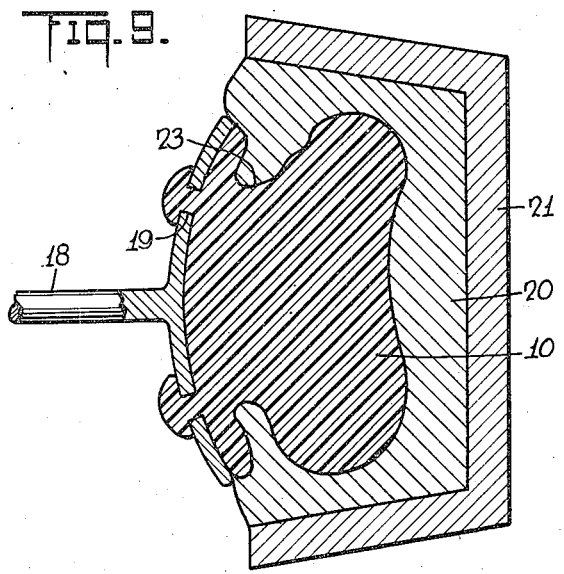
Figure 12:
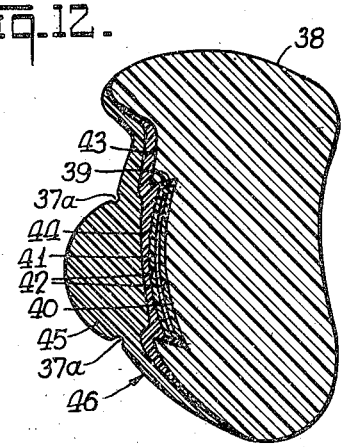

In order to describe the invention more fully, reference is made to the accompanying drawings, in which Figure 1 is a front view of a prosthesis, made in accordance with this invention, Figure 2 is a horizontal section on the line 2—2, Figure 3 is a vertical section on the line 3—3, Figure 4 is a side view, Figure 5 is a back view, Figure 6 is a sectional view illustrating the prosthesis in position in the orbital cavity. Figure 7 is a sectional view illustrating the apparatus and method of injecting the impression material inside and outside the eye socket, Figure 8 is a sectional view illustrating the addition and securement of the impression tray to the impression, Figure 9 is a sectional view showing the forming of the cast from the impression, and the addition thereto of the plaster lock, Figure 10 is a sectional view showing the original wax pattern formed in the cast, to which has been added wax to restore the previous facial contour, Figure 11 is a sectional view of the plastic prosthesis formed from the wax pattern, Figure 12 is a similar view of the completed prosthesis indicating by layers the modifications made in the prosthesis, and Figure 13 is a flow sheet indicating the several steps in the procedure.

Referring to Figures 1, 3 and 6, a superior projection or extension extends upwardly and frontally to restore the lid contour and to accommodate the upper and principal muscle to be accommodated, the levator palpebrae superioris. The slight extension on the lower margin of the prosthesis accommodates the muscle fibres in the lower lid. The concavity in the back portion of the prosthesis, shown in Figures 3, 4, and 5, accommodates the muscle remnants in the fascia of the back wall of the orbital cavity, and the entire back portion of the prosthesis conforms substantially exactly to the configuration of the back wall of the orbital cavity.

Figures 2 and 3 show the position of the iris insert, described in detail below.

The invention may be more fully understood from the following description of the procedure, in which preferred technique and preferred materials are employed, but obviously the invention is not limited thereto.

The first step is the taking of an impression of the eye socket. The impression material may be a dental impression material such as hydrocolloid or alginate material. When alginate material is used, it is added in powdered form to water at a temperature of about 70–75° F. and mixed. Hydrocolloid is prepared by heating in a water bath for about ten minutes and then cooling to a temperature the tissues will tolerate. As shown in Figure 7, the impression material 10 is injected into the eye socket 11, preferably by means of a tube 12 with plunger 13 to expel the material in rod-like form 14 through a tip 15, such as a rubber nursing nipple with enlarged orifice. After filling the cavity 11, the nipple end is carefully withdrawn, more impression material 16 is spread over the surface 17, and pressure exerted to further confine the impression. As shown in Figure 8 pressure may be exerted with a transparent impression tray 18 adapted to facial contours, and the tray should be held securely over the impression material for several minutes to permit hardening apertures 19 allowing the impression material to harden thereto to facilitate removal. The hardened impression material 10 is then removed and washed. If desired, it may be immersed in potassium sulphate solution, or other solution of an electrolyte, for about fifteen minutes to harden or fix the surface.

A working stone cast 20, as shown in Figure 9 is now poured, by carefully vibrating the stone mix, which may be a plaster of Paris compound, over the impression, and pouring a base similar to that made for a denture impression. After hardening, the working cast is lubricated with liquid petrolatum, for example, and a plaster lock 21 is poured around it. The cast is then cut through its vertical dimension, to allow removal of the wax pattern 22, as shown in Figure 10 from the undercut portions 23 of the socket. Dental base plate wax, or similar wax, is warmed and forced into the cast. After cooling, such as by immersion in ice water, the wax pattern 22 is removed from the cast 20 and trimmed where necessary, or additional wax 27 may be added in deficient areas until the wax pattern is adequate.

In preparing the wax pattern, lid areas 28 to be emphasized may be added to, until the wax fulfills the desired facial morphology. Extensions 29 to the pattern may be made, although they do not necessarily conform to the natural curvature of the eye, to compensate for the loss of tissue in the orbit and of tone in the remaining muscle remnants. These extensions, 29, called the intraorbital bulge, are constructed on those portions of the prosthesis not visible after insertion in the eye socket.

The completed wax pattern 30 is smoothed down, using a cotton pellet wet with a solvent such as equal parts of acetone and alcohol. After lubrication with liquid petrolatum, the wax pattern may be inserted into the eye socket, and additional carving or patterning may now be done to functionally adapt the pattern to the particular orifice. Lid reaction should mimic the existing eye, and the profile view of the patient should show duplication of contour.

When the results appear satisfactory as shown in Figure 10, the wax pattern 30 may be removed for duplication in an acrylic resin, such as polymerized methyl-methacrylate. Other resinous materials such as styrenes, vinyls, phenolic resins, urea resins, etc., may be used, but acrylics are preferred. The wax pattern is invested with stone in a flask for curing similar to that shown in Figure 9. After investing, the wax may be removed or boiled out of the flask with hot water, to form a negative. While the flask is still hot, all surfaces are coated with an alginate and allowed to dry; thereby providing separation for the cured acrylic sclera.

To duplicate the scleral color of the patient's existing eye, an exact reproduction of the scleral color is first prepared on a piece of paper and matched against a series of sample scleral colors cured in typical eye shapes. These scleral colors are designated by number, depending on their color tints, and are similar to the shade guide used in the selection of porcelain teeth. They are prepared by adding a white pigment, such as titanium dioxide or fluorescent dolomite, in small quantities to clear fluorescent acrylic polymer, in powdered form, to supply the desired whitish background and opacity. The primary colors, red, blue, and yellow are added, bit by bit, in powdered form and the mixture spatulated. Liquid acrylic monomer is added to a portion of the mixture, drop by drop, until the powdered polymer is saturated to a degree of slight liquid excess, and the sample is then cured in the typical scleral pattern and polished.

The scleral sample painted on paper is matched against the sample scleral colors, using a black mask with two small holes, and the proper mix is selected. Liquid monomer is added to the mix as in preparing the samples, and the mix is allowed to saturate in a closed container. When the mix is putty-like and does not stick to the spatula, it is ready for packing. Cellophane sheets, previously soaked in water and wrung dry, are used to handle the putty-like mix. It is packed with moderate compression into the negative, and in excess to provide additional compression when trial packed. Two sheets of cellophane are placed between the halves of the flask before closure, after which it is placed in a flask clamp with moderate, steady pressure. Either the compression or injection type of flask may be used. The flask is then removed from the clamp and separated, removing excess material or adding material if necessary. The case may be trial packed again if necessary, or it may be finally closed without the cellophane and then be ready for curing.

Curing and polymerization is accomplished by heating, such as by heating in water for about four hours, first at about 160° F. and then at a steady boil during the last fifteen minutes of the cure. After cooling, the flask is opened and the cured sclera 31 is cut from its investment for trimming and polishing.

Excess 32 indicated by the dot-dash line 31, may be removed by the usual vulcanite abrasive stones and cones and at the same time the sclera shaped to the desired form. The sclera is then polished, such as by first polishing on the lathe with fine grit flour of pumice, then with a felt cone, followed with a soft bristle brush, at medium motor speed to avoid scratching, scorching, or distortion of the acrylic duplication of the wax pattern. A high polish may be given with a white rag wheel, at medium motor speed, using prepared chalk until the surface is glass smooth and free from artifacts or scratches.

The polished sclera 33 is now placed in the eye socket, and the exact location 34 of the iris is marked with etching ink. As shown in Figure 11, plasticene 35 or other modelling material is now added to the face of the sclera and modeled in a dome shape over the iris area to form a cornea bearing the same curvature as the normal eye. Small portions of thin plasticene 36 are added to the sides of the dome to create a small concave depression 37 around the iris margin, to duplicate the anatomic concavity observed in the natural eye termed the sulcus sclera. The sclera 33 with sculptured plasticene 35 and 36 is then invested in a flask, and after the stone has hardened, the flask is separated and the plasticene and final prosthesis 38 is removed. A mounted, inverted-cone stone is then used to outline an undercut 39 just within the line marked as shown in Figure 12, and a small stone is used to flatten the areas or provide a slight convexity to the surface within the cut circle. This inlay 40 is about one millimeter below the surface of the face of the sclera.

A painted iris 41 is prepared on paper, such as good quality water color paper. The diameter of the painted iris should be about a millimeter less than actual size, as determined by photographing the existing eye, to allow for magnification produced by the clear mass of acrylic subsequently cured over the painted iris. The pupil is filled in with india ink, and the color around the pupil is mixed from the three primary colors, red, blue, and yellow. Lacquer colors or water colors have proved to be most satisfactory. When the iris of the patient's existing eye is accurately matched, the painted iris is dried and carefully cut from the paper and coated as at 42 to fix and to protect the colors during curing, and a duplicate pattern from white paper is made. The coating to fix and to protect the iris colors during curing is preferably composed of a cencentrated solution of clear methyl methacrylate powder in chemically pure benzene or methyl methacrylate monomer. This coating fix is used by painting the solution smoothly over the water color or lacquer painting on the paper, and then drying to volatilize the benzene or other solvent, leaving a coating of pure methyl methacrylate. It should be noted that in mixing the pigments pure water should be used that is free from contaminating substances and previous water which has been triple distilled. All pigments used should have the greatest value of non-fugitiveness. This paper pattern is tucked into the undercut and should lay without buckling within the inlay. This is most important because it gives to the prosthesis a pleasing diffuse iris margin. Should the inlay be larger than the iris, a very noticeable line will betray the iris inlay around its margin and destroy the illusion of depth. With the paper pattern in the inlay 40, a stone is used to round off the margins of the insert and blend then into scleral contours. This also roughens the surface of the face 43 of the sclera, to receive the drawing of blood vessels and color tinted scleral areas.

The painted iris 41 is then inserted in the inlay 40. Blood vessels are drawn onto the scleral surface 43 with color fast drafting inks, to match existing conditions. These inks actually etch the scleral surface, and are preferable to colored threads because they may be more realistically drawn. Yellow, red, or blue tints may also be painted on the scleral surface with lacquer. At this stage, the entire scleral and iris areas are coated as at 44 with a solution of clear methyl methacrylate polymer and monomer, and this is allowed to dry a short time at ordinary temperatures. The entire prosthesis is then placed in a drying oven at about 100 to 110° F. for about 45 minutes, to thoroughly desiccate the prosthesis.

Clear fluorescent acrylic polymer in powdered form is mixed with a slight excess of liquid acrylic monomer, the mixture is thoroughly spatulated, and then kept in a closed container for five to ten minutes to allow for additional saturation. Environmental conditions of relative humidity and temperature affect the saturation period of the monomer and polymer and the handling of the saturated plastic before insertion in the mold should always be with implements free of moisture, oils or other contaminating substances and should not contact any portion of the human body. In the construction of the eye prosthesis, it is vital not to use any solvent or substance which would depolymerize the prosthesis over an extended period of time. The top half of the flask is carefully tin-foiled over those areas which will contact the clear acrylic 45 when the flask is closed. As before the mix is not used until it has the feel of putty and is not sticky to the spatula. A small quantity of the mix handled with cellophane, is packed over the face of the painted iris and scleral areas, and the upper half of the flask. Cellophane sheets are placed between the acrylic pack, and the flask is closed and placed in a flask clamp. The flask is again opened, the cellophane removed and the quantity of material checked. As before, the case may be trial packed if required, or the final closure made for curing. The flask in the clamp is then placed in a water bath and cured for about two hours, first at about 165° F. and then bringing the water to a rapid boil during the last fifteen minutees of the cure. The flask, after cooling, may then be opened and the prosthesis 46 removed from its investment.

Mounted abrasive stones are first used to shape the clear acrylic portion of the prosthesis to conform as nearly as possible to the natural eye. Then it is polished on the lathe with powdered pumice on felt cones and a soft bristle brush, and a high polish is given with a rag wheel and prepared chalk. The iris is now visible through the clear acrylic. The center of the dome of clear acrylic should be exactly over the center of the pupil, and it must be symmetrical in contour. A small mounted stone is then used to accentuate the concave depression 37a in the clear acrylic around the margin of the iris. The prosthesis is again taken to the lathe, and the soft bristle brush wheel is used, with powdered pumice, to polish the bottom of the concave sclera sulcus 37a at the periphery of the domed acrylic directly over the iris. This eliminates a continuity of light reflection from the iris area onto the scleral areas, and captures in the clear acrylic, spot light reflections on the iris similar to the natural eye. Any ususual light reflection may be corrected by grinding the surfaces of the clear acrylic to represent the anatomic form of the existing eye. Bars of light reflected from fluorescent light tubes, may be exactly duplicated in the acrylic prosthesis to match light reflections in the natural eye. This important property of the material used should be utilized to create a replacement more desirable than previously employed prostheses.

The completed prosthesis is then lubricated with clear mineral oil and inserted into the eye socket. The patient should wear the replacement for several hours, or over night, before making alterations because the muscles and tissues of the orbit will compensate and adjust themselves to a considerable extent. At that time it may be necessary to grind full areas on the surface, or other areas, which should be polished before inserting again into the eye socket. This type of prosthesis has this advantage, together with the quality of repolishing should the surfaces require, because of the eye socket secretions etching, accidental scratching or other damage.

Other advantages of the artificial eyes of this invention are that the natural contours existing in the face before eye loss are restored, and the replacement is capable of lateral, oblique, and vertical movements. Light reflections may be accurately reproduced to simulate the existing eye, and color matching or variation may be controlled to satisfy esthetic requirements. When the prosthesis contacts the surfaces of the eye socket, it is capable of exerting a stimulating effect on orbital tissues, and of increasing the invigoration of the eye muscles. The material used is not as susceptible to etching from the eye socket fluids or secretions, and if scratched from handling it may be repolished. The acrylic ocular prosthesis is unbreakable to usual accidental stresses, and if broken by extreme stresses it can be repolymerized or the entire artificial eye readily duplicated.

A comprehensive description and discussion of the technique herein disclosed may be found in the U. S. Naval Medical Bulletin, vol. 43, No. 6, dated December 1944, entitled Eye replacement by acrylic maxillofacial prosthesis, prepared by the applicants, pages 1085 to 1099 containing many illustrations and a chart in color in actual size and coloring of the prosthesis from the National Naval Medical Center, a copy of which is attached to the file wrapper of this application and made a part hereof.

The invention described herein may be manufactured and used by or for the Government of the United States of America for governmental purposes without the payment of any royalties thereon or therefor.

We claim:

1. A readily removable ocular prosthesis comprising a solid body portion having an anterior wall provided with scleral, iris and corneal section conforming substantially to the color and shape of the natural eye; a posterior wall the surface of which entirely covers and conforms exactly to the existing posterior wall of the ocular cavity; and lateral walls extending to the remaining walls of the ocular cavity, said prosthesis when inserted into the ocular cavity engaging the muscle remnants in the fascia of the posterior wall of the cavity to obtain maximum lateral, oblique and vertical movements of the prosthesis and stimulating the orbital tissues and muscle segments.

2. The ocular prosthesis of claim 1, wherein the upper margin of the anterior wall located above the upper eyelid when positioned in the ocular cavity, is provided with a lateral extending bulge projecting into the pars orbitalis.

3. A method of forming an ocular prosthesis which comprises forming a pattern, the posterior wall of which conforms exactly to the posterior wall of the ocular cavity; next shaping the anterior wall of the pattern by adding material to the pattern until it conforms approximately to the anterior position corresponding to the contours of the natural eye; and making a casting of the pattern employing the material of which it is desired to make the prosthesis.

4. An ocular prosthesis comprising a body member having a visible scleral portion, the anterior portion of which is provided with a circular undercut recess; an iris member made of flexible material positioned in said recess and having a diameter slightly larger than the opening to the circular recess; and a transparent corneal section secured to and enclosing the scleral portion including the circular recess.

5. An ocular prosthesis comprising a body member having a visible scleral surface when positioned in the eye socket, the anterior portion of which is provided with a dome-shaped transparent corneal section; the junction between the corneal section and the scleral surface being shaped in the form of a sulcus.

PHELPS J. MURPHEY.
LEON SCHLOSSBERG.

REFERENCES CITED

The following references are of record in the file of this patent:

UNITED STATES PATENTS

| Number | Name | Date |
|---|---|---|
| 303,726 | Hamecher | Aug. 19, 1884 |
| 305,102 | Nelson | Sept. 16, 1884 |
| 762,298 | Fukala | June 14, 1904 |
| 1,979,321 | Dunner | Nov. 6, 1934 |
| 1,993,121 | Travers | Mar. 5, 1935 |
| 2,013,295 | Tidd | Sept. 3, 1935 |
| 2,163,014 | Voigt | June 20, 1939 |
| 2,279,067 | Shapiro | Apr. 7, 1942 |
| 2,301,174 | Dietz | Nov. 10, 1942 |
| 2,322,117 | Dimitry | June 15, 1943 |
| 2,341,604 | Dresch | Feb. 15, 1944 |
| 2,370,389 | Bessin et al. | Feb. 27, 1945 |
| 2,394,400 | Noles | Feb. 5, 1946 |

FOREIGN PATENTS

| Number | Country | Date |
|---|---|---|
| 805,592 | France | Aug. 31, 1936 |

OTHER REFERENCES

"Mold and Casting," C. D. Clarke, J. D. Lucas Co., publishers, Baltimore, Md., pages 172 and 173. (A copy in Div. 55 Patent Office.)

"Oregon Journal," Sunday, October 11, 1942, page 7, article by F. T. Humphrey in respect to the artificial eye of S. O. Noles. (A copy is in Div. 55 of the Patent Office.)